US006356817B1

(12) United States Patent
Abe

(10) Patent No.: US 6,356,817 B1
(45) Date of Patent: Mar. 12, 2002

(54) POWER OUTPUT UNIT, METHOD OF CONTROLLING THE POWER OUTPUT UNIT, AND HYBRID VEHICLE

(75) Inventor: Tetsuya Abe, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/571,529

(22) Filed: May 16, 2000

(30) Foreign Application Priority Data

May 18, 1999 (JP) .......................................... 11-136549

(51) Int. Cl.[7] ................................................ F02N 11/06
(52) U.S. Cl. ...................... 701/22; 290/40 A; 290/40 B; 290/40 E; 290/40 F; 180/652
(58) Field of Search ........................ 701/22; 290/40 A, 290/40 B, 40 C, 40 R, 38 R, 45, 46; 180/65.2; 318/8, 9, 34, 51, 52

(56) References Cited

U.S. PATENT DOCUMENTS

| 5,791,426 A | * | 8/1998 | Yamada et al. ............ 180/65.2 |
| 5,844,342 A | * | 12/1998 | Miyatani et al. ............ 310/114 |
| 5,903,113 A | * | 5/1999 | Yamada et al. ............... 318/10 |
| 5,936,312 A | * | 8/1999 | Koide et al. .............. 290/40 R |
| 6,067,801 A | * | 5/2000 | Harada et al. ................ 60/705 |
| 6,161,640 A | * | 12/2000 | Yamaguchi ................ 180/65.8 |
| 6,166,499 A | * | 12/2000 | Kanamori et al. .......... 318/139 |
| 6,172,427 B1 | * | 1/2001 | Shinohara et al. ........ 290/40 B |
| 6,208,034 B1 | * | 3/2001 | Yamaguchi ............... 290/40 C |
| 6,247,437 B1 | * | 6/2001 | Yamaguchi et al. ..... 123/179.3 |

* cited by examiner

Primary Examiner—William A. Cuchlinski, Jr.
Assistant Examiner—Marthe Marc-Coleman
(74) Attorney, Agent, or Firm—Kenyon & Kenyon

(57) ABSTRACT

A power output unit of the present invention sufficiently ensures the performance of a vehicle by sufficiently developing the performance of an engine without enlarging a motor. In a hybrid vehicle, a power requirement for the engine is set based on a vehicle speed and an accelerator opening degree. Usually, while giving priority to efficiency, an operation state of the engine is set based on a power requirement. Once the operation state of the engine is set, operation states of first and second motors are set based on a vehicle speed and a drive force. If the thus-set operation state of the first or second motor exceeds a threshold value, the operation state of the first or second motor is set so as not to exceed the threshold value. Based on the setting result and the power requirement, an operation state of the engine is set.

11 Claims, 9 Drawing Sheets

*PRIOR ART*

FIG. 2 *PRIOR ART*
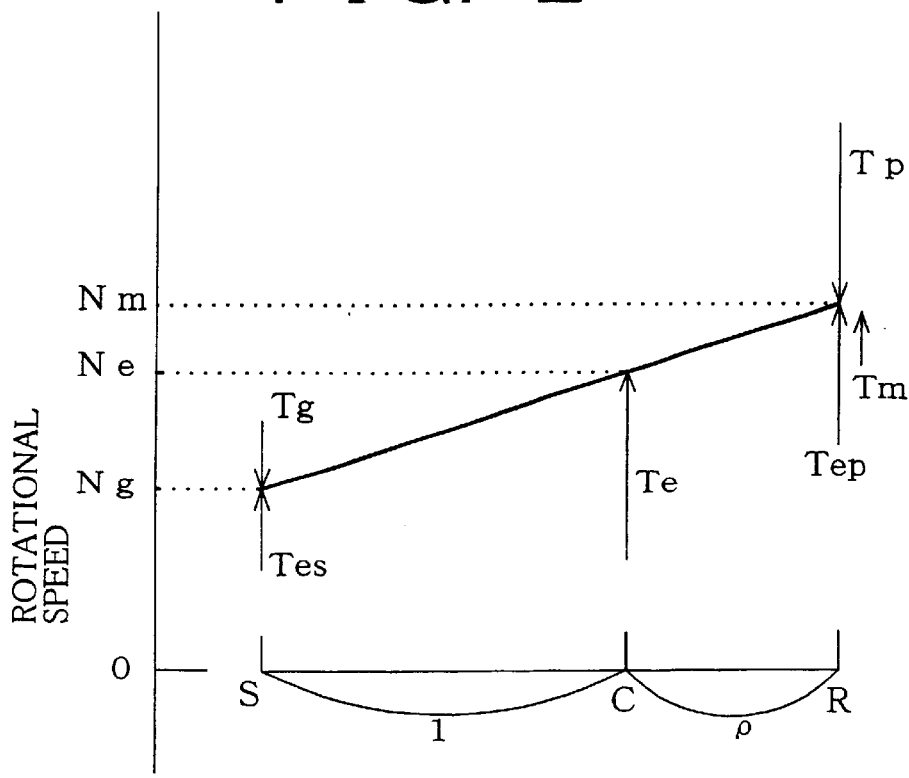
FIG. 3 *PRIOR ART*
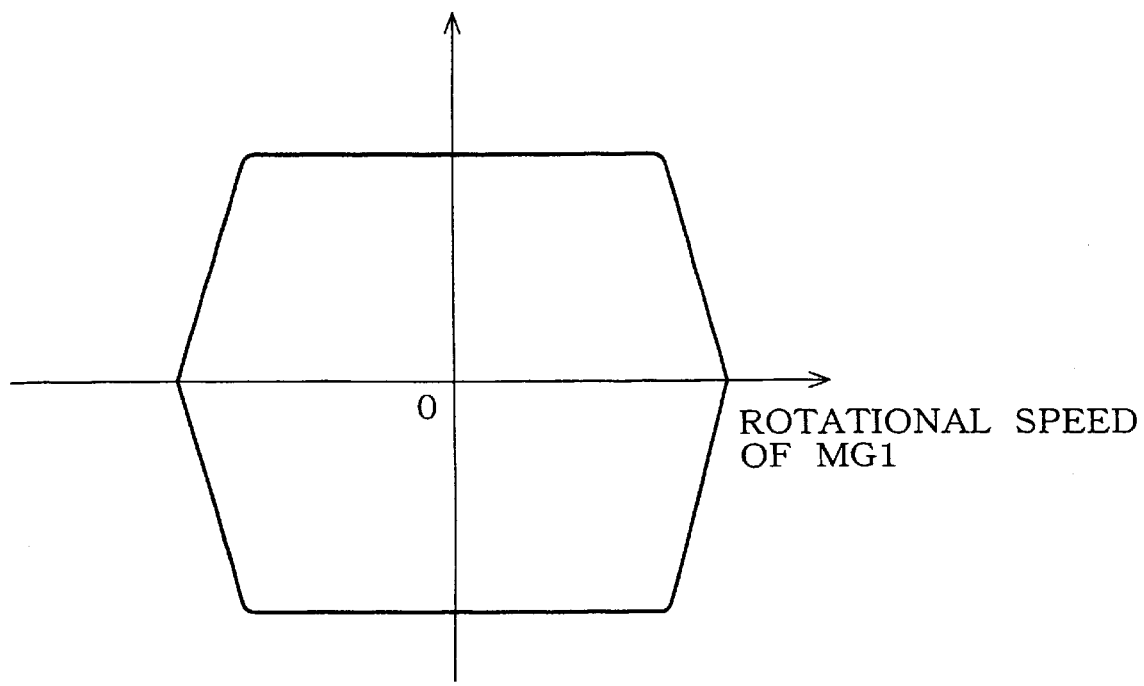

PRIOR ART

*PRIOR ART*

FIG. 7
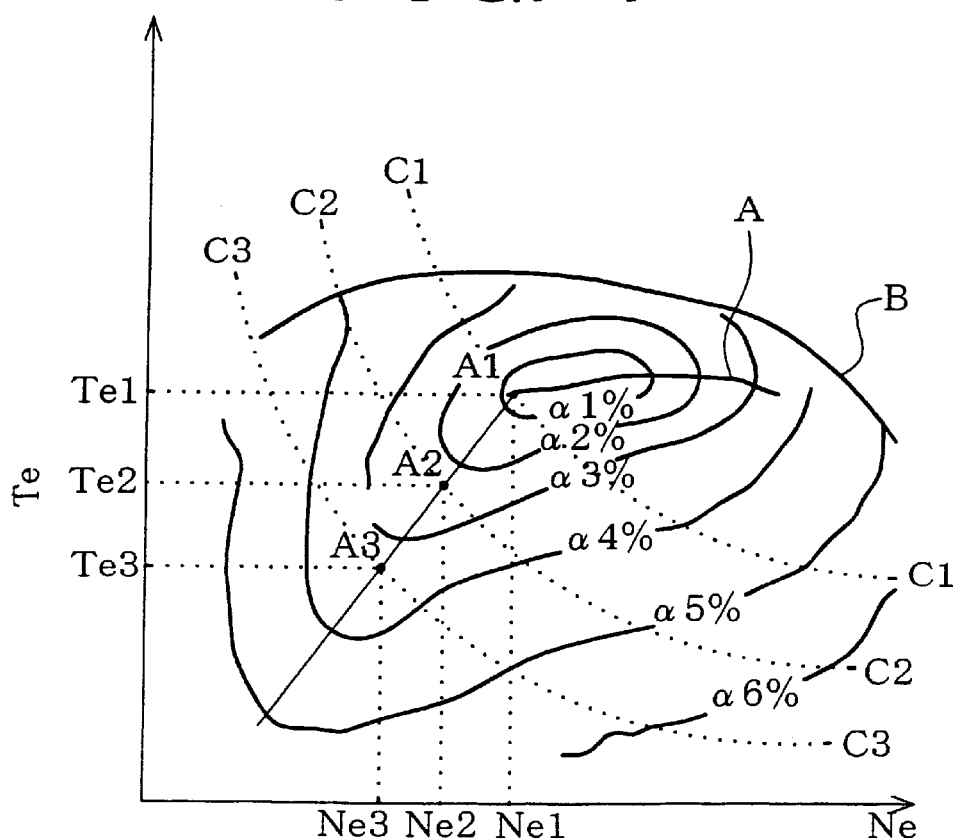
FIG. 8 *PRIOR ART*
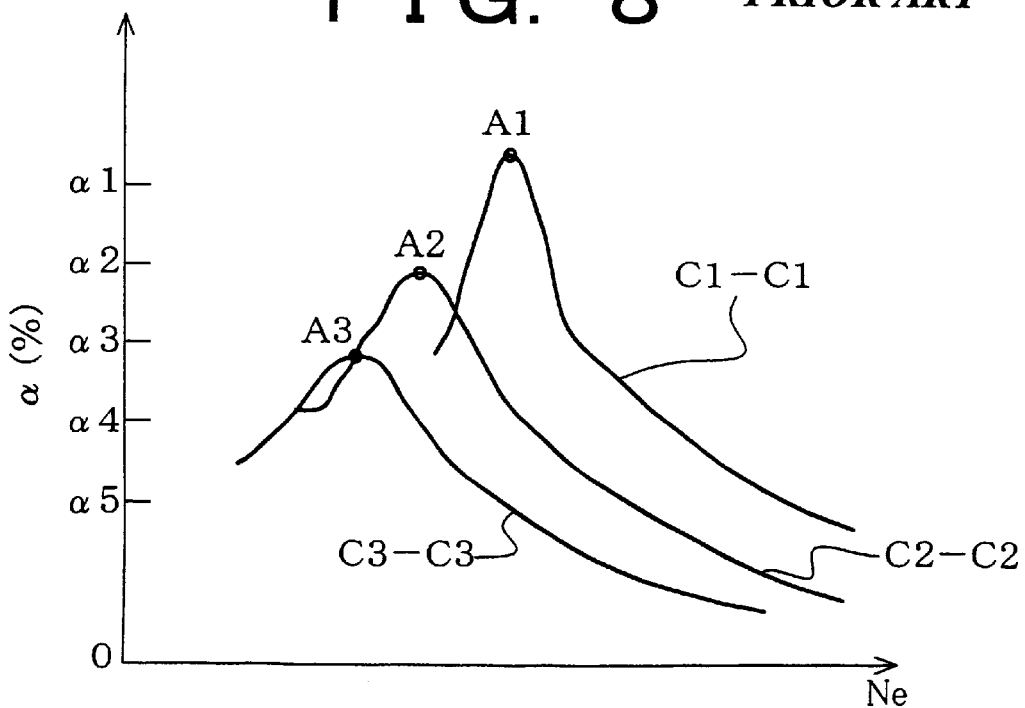

POWER OUTPUT UNIT, METHOD OF CONTROLLING THE POWER OUTPUT UNIT, AND HYBRID VEHICLE

INCORPORATION BY REFERENCE

The disclosure of Japanese Patent Application No. HEI 11-136549 filed on May 18, 1999 including the specification, drawings and abstract is incorporated herein by reference in its entirety.

BACKGROUND OF THE INVENTION

1. Field of the Invention

The present invention relates to a power output unit, a method of controlling the power output unit, and a hybrid vehicle. More particularly, the present invention relates to a power output unit which has an internal combustion engine and motor-generators and in which an output shaft of the internal combustion engine, rotational shafts of the motor-generators and a drive shaft are mechanically connected to one another, a method of controlling the power output unit, and a hybrid vehicle.

2. Description of the Related Art

In recent years, various constructions have been proposed for a hybrid vehicle having motor-generators in addition to an internal combustion engine. A hybrid vehicle makes it possible to significantly reduce an amount of consumption of fossil fuel in comparison with a vehicle having a gasoline engine. As environmental problems become acute, social demands for hybrid vehicles grow. A parallel hybrid vehicle is one of such hybrid vehicles. In a parallel hybrid vehicle, both a power from an internal combustion engine and a power from an electric motor can be transmitted to a vehicle axle. FIG. 1 shows an example of the structure of a parallel hybrid vehicle. The hybrid vehicle shown in FIG. 1 has an engine 150 and motor-generators MG1, MG2. These three components are mechanically coupled to one another through a planetary gear 120. The planetary gear 120 is composed of three gears and has three rotational shafts respectively coupled to the gears. The gears constituting the planetary gear 120 are a sun gear 121 which rotates at the center, a planetary pinion gear 123 which rotates around the sun gear 121 while auto rotating, and a ring gear 122 which rotates around the planetary pinion gear 123. The planetary pinion gear 123 is pivoted on a planetary carrier 124. In the hybrid vehicle shown in FIG. 1, a crank shaft 156 serving as a drive shaft of the engine 150 is coupled to a rotational shaft of the planetary carrier 124, thus constituting a planetary carrier shaft 127. A drive shaft of the motor-generator MG1 is coupled to a rotational shaft of the sun gear 121, thus constituting a sun gear shaft 125. A drive shaft of the motor-generator MG2 is coupled to a rotational shaft of the ring gear 122, thus constituting a ring gear shaft 126. Furthermore, the ring gear 122 is coupled to a vehicle axle 112 through a chain belt 129 and a differential gear.

For the purpose of explaining the basic operation of a hybrid vehicle having such a construction, operation of the planetary gear 120 will first of all be described. In the planetary gear 120, if rotational speeds of two of the three rotational shafts and a torque of one of the three rotational shafts (hereinafter a rotational speed and a torque of a certain rotational shaft will comprehensively be referred to as a rotational state) are determined, rotational states of all the rotational shafts are determined. Although a relation among rotational states of the rotational shafts can be found out using a calculation formula which is well known to the community of mechanics, it can also be found out geometrically by means of an alignment chart.

FIG. 2 shows an alignment chart as an example. While the axis of ordinate shows rotational speeds of the rotational shafts, the axis of abscissa shows a relation in distance among gear ratios of the gears. A position C, which is an interior division point of 1: $\rho$ between the sun gear shaft 125 (S in FIG. 2) and the ring gear shaft 126 (R in FIG. 2), is defined as a position of the planetary carrier shaft 127. The value of $\rho$ represents a ratio (Zs/Zr) of the number of teeth of the sun gear 121 (Zs) to the number of teeth of the ring gear 122 (Zr). For the points S, C and R defined along the axis of abscissa, rotational speeds Ng, Ne and Nm of the rotational shafts are plotted respectively. According to the feature of the planetary gear 120, the three points that have thus been plotted never fail to be aligned along a single line. This line is referred to as an operation co-line. A line is uniquely determined if two points are specified. Thus, reference to this operation co-line makes it possible to calculate a rotational speed of one of the three rotational shafts from rotational speeds of the remaining two rotational shafts.

According to the feature of the planetary gear 120, when torque values of the rotational shafts are replaced with forces acting on the operation co-line, the operation co-line maintains its balance as a rigid body. As a concrete example, a torque acting on the planetary carrier shaft 127 is defined as Te. In this case, as shown in FIG. 2, a force corresponding to the torque Te is applied upwards to the operation co-line at the position C. A direction of application of the force is determined in accordance with a direction of the torque Te. Also, a torque Tp acting on the ring gear shaft 126 is applied downwards to the operation co-line at the position R. Tes and Tep shown in FIG. 2 are two equivalent forces obtained as a result of distribution of the torque Te according to the law of distribution of forces acting on a rigid body. The torque values Tes, Tep can be expressed by the following formulas (1) and (2).

$$Tes = \rho/(1+\rho) \times Te \qquad (1)$$

$$Tep = 1/(1+\rho) \times Te \qquad (2)$$

In consideration of a condition that the operation co-line is balanced as a rigid body during application of those forces, it is possible to calculate a torque Tg to be applied to the sun gear shaft 125 by the motor-generator MG1 and a torque Tm to be applied to the ring gear shaft by the motor-generator MG2. The torque Tg becomes equal to the torque Tes, and the torque Tm becomes equal to a difference between the torque Tp and the torque Tep. The torque values Tg, Tm having such features are expressed by the following formulas (3) and (4) respectively.

$$Tg = -\rho/(1+\rho) \times Te \qquad (3)$$

$$Tm = Tp - 1/(1+\rho) \times Te \qquad (4)$$

While the engine 150 coupled to the planetary carrier shaft 127 rotates, the sun gear 121 and the ring gear 122 can rotate in various operation states with the aforementioned conditions on the operation co-line being satisfied. When the sun gear 121 rotates, it is possible to generate electricity in the motor-generator MG1 by means of a rotational power of the sun gear 121. When the ring gear 122 rotates, it is possible to transmit a power outputted from the engine 150 to the vehicle axle 112. In a hybrid vehicle having a construction shown in FIG. 1, a power outputted from the engine 150 is divided into a power that is mechanically transmitted to the vehicle axle 112 and a power that is converted into electric power through regeneration of one of the motor-generators MG1, MG2 (operating as a generator).

Furthermore, the electric power that has been regenerated is used for power running of the other motor-generator (operating as an electric motor), whereby the vehicle can travel with a desired power outputted to the vehicle axle 112. Thus, when the hybrid vehicle constructed as shown in FIG. 1 travels, the motor-generators MG1, MG2 usually perform power running or regeneration. In this case, control is performed such that the electric power consumed during power running is balanced against the electric power generated during regeneration.

In the hybrid vehicle constructed as shown in FIG. 1, when controlling a travelling state of the vehicle, a torque requirement for the vehicle axle 112 (actually the ring gear shaft 126 mechanically coupled to the vehicle axle) is first of all determined from a vehicle speed and an accelerator opening degree. A power requirement to be outputted from the ring gear shaft 126 is determined from the torque requirement and the vehicle speed. Then, a power to be outputted from the engine 150 is determined such that the ring gear shaft 126 becomes capable of outputting the power requirement. A drive state of the engine 150 is controlled such that the engine 150 outputs the thus-determined power. Drive states of the motor-generators MG1, MG2 are controlled such that the aforementioned torque requirement is satisfied in the ring gear shaft 126 when the engine 150 outputs the aforementioned power. The motor-generators MG1, MG2 perform power running or regeneration, whereby a predetermined power outputted from the engine is converted into a desired rotational speed and a desired torque and outputted from the ring gear shaft 126, namely, from the vehicle axle 112.

In outputting a predetermined power corresponding to a power requirement that has been determined as a power to be outputted from the ring gear shaft 126, the engine 150 can assume various operation states (combinations of rotational speeds and output torque values). Thus, when the engine is controlled to output a predetermined power, an operation point of the highest efficiency is selected. Drive states of the motor-generators MG1, MG2 are controlled such that the engine is driven at the operation point.

After calculation of the operation point of the highest efficiency at the time when the engine 150 outputs the aforementioned predetermined power, a rotational speed and a torque at the operation point are set as a target rotational speed and a target torque of the engine 150 respectively. As described above, the drive shaft of the engine 150 is coupled to the rotational speed of the planetary carrier 124. Therefore, when the engine 150 outputs the predetermined power while being in operation at the operation point, the rotational speed of the planetary carrier shaft 127 is equal to the target rotational speed of the engine 150 that has been determined as described above. Also, the rotational shaft of the ring gear 122 is coupled to the drive shaft of the motor-generator MG2, and the ring gear 122 is mechanically coupled to the vehicle axle 112. Thus, a rotational speed of the ring gear shaft 126 can uniquely be calculated from the vehicle speed. Because the rotational shaft of the sun gear 121 and the drive shaft of the motor-generator MG1 are coupled to each other, the rotational speed of the motor-generator MG1 is equal to the rotational speed of the sun gear shaft 125. Once the rotational speed of the ring gear shaft 126 and the rotational speed of the planetary carrier shaft 127 are determined, a rotational speed of the sun gear shaft 125 can be calculated from the alignment chart shown in FIG. 2. Once rotational speeds of the rotational shafts coupled to the gears constituting the planetary gear 120 are thus determined, torque values to be outputted from the motor-generators MG1, MG2 are determined through a predetermined processing. If the engine 150 is controlled to output the predetermined power while controlling operation states of the motor-generators MG1, MG2 so that they are driven under such a condition, the engine 150 is operated in a state where the engine 150 demonstrates its highest efficiency. Thus, it is possible to realize a desired operation state in the hybrid vehicle.

The motor-generators MG1, MG2 perform power running or regeneration as described above, and can assume operation states corresponding to various rotational speeds and various output torque values. These rotational speeds and output torque values have threshold values. FIGS. 3 and 4 are explanatory views of output characteristics showing the threshold values of rotational speeds and output torque values of the motor-generators MG1, MG2. These threshold values are determined in accordance with the performance of the motors themselves or mechanical properties of the motors. Thus, in the hybrid vehicle, when an attempt is made to realize a desired operation state in the vehicle axle by converting a power outputted from the engine 150 through the planetary gear 120 and controlling the motor-generators MG1, MG2, operation states set for the motor-generators MG1, MG2 may exceed the threshold values of the motor-generators. That is, even if a power outputted from the engine 150 is within a range of the performance of the engine 150, an operation state determined for the motor-generator MG1 or MG2 may exceed the threshold values shown in FIGS. 3 and 4.

In the hybrid vehicle constructed as shown in FIG. 1, an operation state as shown in the alignment chart in FIG. 5 may arise when the vehicle speed is increased. In this state, the motor-generator MG2 regenerates electric power while the ring gear shaft 126 rotates in a positive direction. The motor-generator MG1 performs power running, whereby an electric power equivalent to the electric power regenerated by the motor-generator MG2 is consumed. An operation state of the motor-generator MG2 at the time when the hybrid vehicle assumes such an operation state is indicated as an example by a point α in FIG. 4, which is an explanatory view of output characteristics of the motor-generator MG2. If an accelerator pedal is depressed to increase a vehicle speed of the hybrid vehicle, control is performed to increase a rotational speed of the ring gear shaft 126, namely, a rotational speed of the motor-generator MG2. At this moment, the operation state of the motor-generator MG2, which is determined based on the aforementioned power requirement and an operation point where the engine 150 demonstrates its highest efficiency, becomes an operation state corresponding to a position marked with β in FIG. 4. That is, the threshold value of the operation state of the motor-generator MG2 is surpassed.

The operation demanded of the motor-generator MG2 becomes a state corresponding to the position marked with β in FIG. 4. In the case of excess of the threshold value, the motor-generator MG2 cannot assume such an operation state. Therefore, even in the case where the engine 150 still outputs sufficient power in comparison with the aforementioned power requirement, the vehicle speed cannot further be increased. Thus, in such a case, an upper limit of the vehicle speed is set not by a power that can be outputted by the engine 150 but by the performance of the motor-generator MG2.

In such a hybrid vehicle, if an attempt is made to realize a higher vehicle speed within the limit of an output state of the engine 150 in consideration of various travelling states, it is necessary to install motor-generators which are larger in size. That is, the motor-generators MG1, MG2 to be installed are sufficiently large in size, the motor-generators MG1, MG2 can be used for every possible travelling state within the range where the engine 150 can output power. However, if motor-generators larger in size are installed, the motor-generators occupy a greater space. Therefore, there is caused a problem of an increase in restrictions imposed on the design of the vehicle. Also, an increase in vehicle weight leads to a problem of deterioration of fuel consumption rate. Thus, it has been desired to realize a higher vehicle speed by sufficiently developing the performance of the engine without enlarging the motor-generators and thus improve the performance of the vehicle.

SUMMARY OF THE INVENTION

It is an object of a power output unit, a method of controlling the power output unit and a hybrid vehicle of the present invention to solve the aforementioned problems and sufficiently ensure the performance of the vehicle by sufficiently developing the performance of an engine without enlarging motors.

In a first aspect of the present invention, there is provided a power output unit comprising an engine having an output shaft, electric motors coupled to a drive shaft transmitting a power outputted from the engine through the output shaft to the outside, a power adjuster which is coupled to the output shaft and the drive shaft and which adjusts a power from the output shaft by means of electric power to transmit the power to the drive shaft, a power requirement calculator which calculates a power required for the engine, a rotational speed judging device which detects a rotational speed of the drive shaft and which compares the rotational speed with a permissible rotational speed of the electric motors, an operation state setting device which sets operation states of the electric motors such that the electric motors assume an output torque approximately equal to zero and a rotational speed equal to a rotational speed of the drive shaft and which sets an operation state of the engine based on the set operation states of the electric motors and the power requirement, and an operator which operates the engine, the power adjuster and the electric motors based on the operation state set by the operation state setting device.

In the thus-constructed power output unit of the present invention, the power adjuster, which is coupled to the drive shaft outputting a power to the output shaft of the engine and to the outside, transmits a power outputted from the engine to the drive shaft, and adjusts the drive power through exchange of electric power. This power output unit receives a rotational speed of the drive shaft and determines whether or not the rotational speed of the drive shaft has exceeded the threshold value of a rotational speed which is permissible when the electric motors coupled to the drive shaft output power. If it is determined that the threshold value of the rotational speed has been exceeded, operation states of the electric motors are set such that the electric motors assume an output torque approximately equal to zero and a rotational speed equal to the rotational speed of the drive shaft. Based on the set operation states of the electric motors and the power requirement for the engine, an operation state of the engine is set. The engine, the power adjuster and the electric motors are operated such that the electric motors and the engine assume the operation states that have been set.

This eliminates the possibility of the rotational speed of the drive shaft of the power output unit being limited by the performance of the electric motors. If sufficient power is outputted from the engine, it is possible to output a power composed of a desired rotational speed and a desired torque from the drive shaft while operating the electric motors such that output torque values of the electric motors become approximately equal to zero. This makes it possible to suppress the performance of the electric motors required to output a desired power from the drive shaft and reduce the size of the electric motors installed in the power output unit.

In the aforementioned aspect of the present invention, the power output unit may further comprise a secondary battery which can exchange electric power with the power adjuster and with the electric motors and a balance calculator which calculates an energy balance at least based on an energy loss generated during transmission of a power from the engine to the drive shaft and on a requirement for charge and discharge in the secondary battery. The operation state setting device corrects a power outputted from the engine by correcting a rotational speed of the engine based on the energy balance calculated by the balance calculator, when setting an operation state of the engine. The operator operates the engine and the power corrected by the operation state setting device.

In this construction, even in the case where the output torque of the drive shaft is affected by an output torque of the engine, the power outputted from the engine is corrected using a rotational speed of the engine. Thus, the torque outputted from the engine does not change. As a result, correction of the power outputted from the engine prevents the power outputted from the drive shaft from deviating from a desired value. In another aspect of the present invention, there is provided a power output unit comprising an engine having an output shaft, electric motors coupled to a drive shaft transmitting a power outputted from the engine through the output shaft to the outside, a power adjuster which is coupled to the output shaft and the drive shaft and which adjusts a power from the output shaft by means of electric power to transmit the power to the drive shaft, a power requirement calculator which calculates a power required for the engine, a rotational speed judging device which detects a rotational speed of the drive shaft and which compares the rotational speed with a permissible rotational speed of the electric motors, a torque setting device which sets an operation state of the engine based on the calculated power requirement and which sets output torque values of the electric motors based on the set operation state of the engine when the detected rotational speed is equal to or lower than the permissible rotational speed, a torque judging device which compares the set output torque values of the electric motors with a predetermined amount, an operation state setting device which sets operation states of the electric motors such that the electric motors assume an output torque approximately equal to zero and a rotational speed equal to a rotational speed of the drive shaft and which sets an operation state of the engine based on the set operation states of the electric motors and the power requirement, and an operator which operates the engine, the power adjuster and the electric motors based on the operation state set by the operation state setting device.

In the thus-constructed power output unit, the power adjuster, which is coupled to the drive shaft outputting a power to the output shaft of the engine and to the outside, transmits the power outputted from the engine to the drive shaft, and adjusts the transmitted power through exchange of electric power. This power output unit receives a rotational speed of the drive shaft and determines whether or not the rotational speed of the drive shaft has exceeded a threshold value of a rotational speed which is permissible when the electric motors coupled to the drive shaft output power. If it is determined that the threshold value of the rotational speed has not been exceeded, an operation state of the engine is set based on the power requirement for the engine. Output torque values of the electric motors are set based on the operation state of the engine that has thus been set. If it is determined that the thus-set output torque values of the electric motors have exceeded the threshold value, operation states of the electric motors are set such that the electric motors assume an output torque lower than the threshold value and a rotational speed equal to the rotational speed of the drive shaft. Also, an operation state of the engine is set based on the set operation states of the electric motors and the power requirement. Further, the engine, the power adjuster and the electric motors are operated such that the electric motors and the engine assume the set operation states.

This eliminates the possibility of the power outputted from the drive shaft being limited by the performance of the electric motors. If sufficient power is outputted from the engine, it is possible to output a desired torque and a desired rotational speed from the drive shaft while operating the electric motors such that output torque values of the electric motors are confined to the range of the threshold value. This makes it possible to suppress the performance of the electric motors required to output a desired power from the drive shaft and further reduce the size of the electric motors installed in the power output unit.

BRIEF DESCRIPTION OF THE DRAWINGS

The foregoing and further objects, features and advantages of the present invention will become apparent from the following description of preferred embodiments with reference to the accompanying drawings, wherein:

FIG. 2 an alignment chart explaining an operation principle of the power output unit of the embodiment;

FIG. 3 is an explanatory view of an output characteristic of an MG1;

FIG. 7 is an explanatory view showing a relation between operation points and operation efficiencies in an engine;

FIG. 8 is an explanatory view showing a relation between engine speeds and operation efficiencies when power requirement is constant;

DESCRIPTION OF PREFERRED EMBODIMENT OF THE INVENTION

Embodiments of the present invention will be described hereinafter with reference to the drawings.

Figure 1:
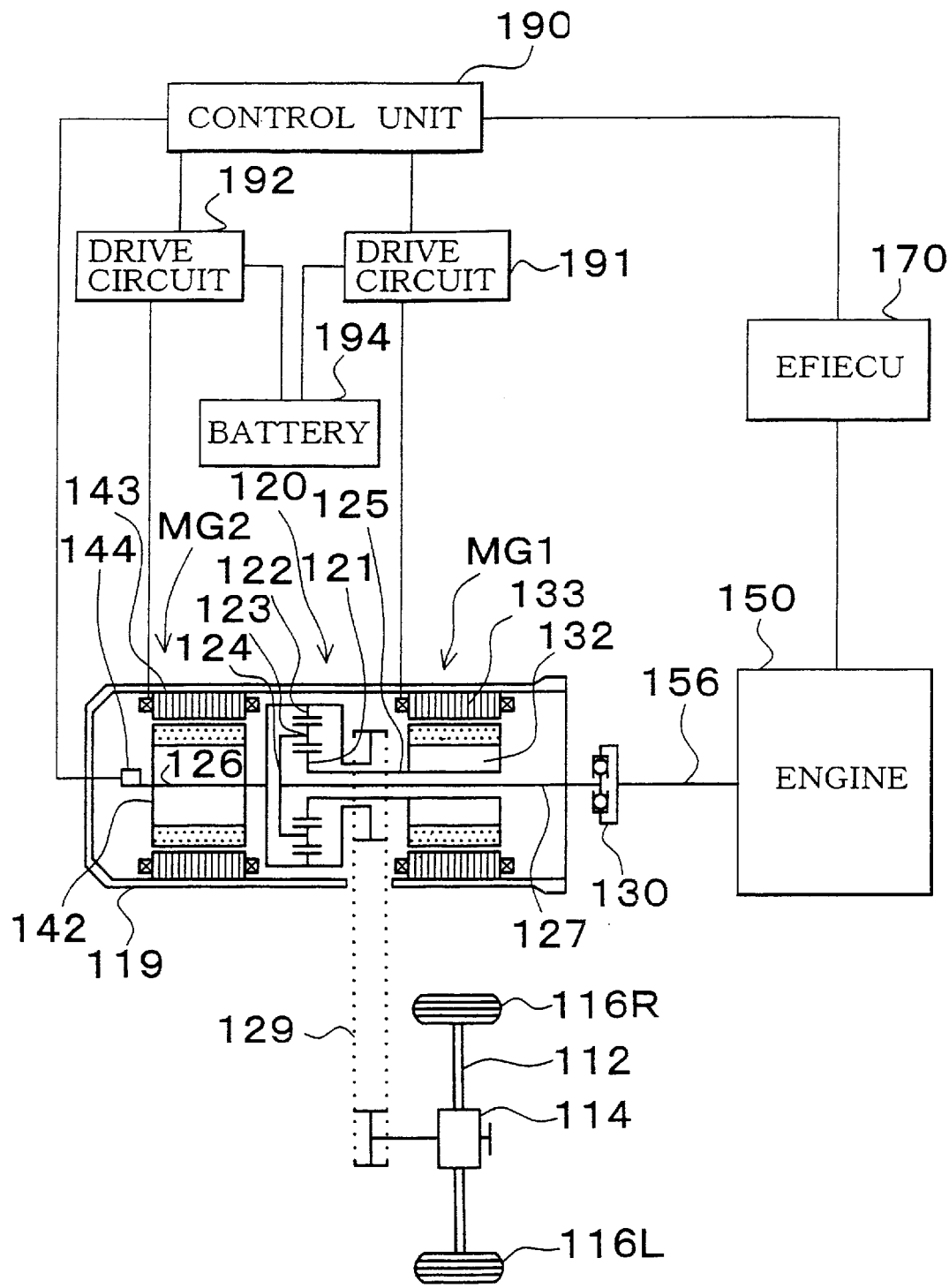
FIG. 1 schematically shows the structure of a hybrid vehicle employing a power output unit in accordance with an embodiment of the present invention.

First of all, the structure of a hybrid vehicle to which a power output unit in accordance with an embodiment of the present invention is applied will be described with reference to FIG. 1. A power system of this hybrid vehicle is constructed as follows. An engine 150, which is designed as a prime mover installed in the power system, is an ordinary gasoline. The engine 150 rotates a crank shaft 156. A fuel injection electronic control unit (hereinafter referred to as an EFIECU) 170 controls operation of the engine 150. The EFIECU 170 is a one-chip microcomputer including a CPU, a ROM, a RAM and the like. In accordance with a program stored in the ROM, the CPU controls fuel injection in the engine 150 and performs other control operations. Although not shown in the drawings, various sensors indicative of an operation state of the engine are connected to the EFIECU 170 so that those control operations can be performed.

Further, the power system has motors MG1, MG2. The motors MG1, MG2 are designed as synchronous generators and have rotors 132, 142 and stators 133, 143 respectively. A plurality of permanent magnets are disposed on an outer peripheral face of each of the rotors 132, 142. A three-phase coil forming a rotating magnetic field is wound around each of the stators 133, 143. The stators 133, 143 are fixed to a case 119. The three-phase coils wound around the stators 133, 143 of the motors MG1, MG2 are connected to a battery 194 through drive circuits 191, 192 respectively. The drive circuits 191, 192 are transistor inverters having a pair of transistors designed as a switching element for each phase. The drive circuits 191, 192 are connected to a control unit 190. As soon as the transistors in the drive circuits 191, 192 are switched by a control signal from the control unit 190, an electric current flows between the battery 194 and the motors MG1, MG2. The motors MG1, MG2 can also operate as an electric motor which is rotationally driven upon receiving electric power from the battery 194. When the rotors 132, 142 rotate due to an external force, the motors MG1, MG2 can function as a generator which produces an electromotive force at opposed ends of the three-phase coil and charge the battery 194.

The engine 150 and the motors MG1, MG2 are mechanically coupled to one another through a planetary gear 120. The planetary gear 120 is composed of a sun gear 121, a ring gear 122 and a planetary carrier 124 having a planetary pinion gear 123. In the hybrid vehicle of this embodiment, the crank shaft 156 of the engine 150 is coupled to a planetary carrier shaft 127 through a damper 130. The damper 130 is provided to absorb twisting vibrations generated in the crank shaft 156. The rotor 132 of the motor MG1 is coupled to a sun gear shaft 125. The rotor 142 of the motor MG2 is coupled to a ring gear shaft 126. Rotation of the ring gear 122 is transmitted to a vehicle axle 112 and wheels 116R, 116L through a chain belt 129.

The planetary gear 120 operates as has been described with reference to the alignment chart in FIG. 2. The hybrid vehicle of this embodiment can travel in a variety of states based on the operation of the planetary gear 120. That is, as described above, control of operation of the motors MG1, MG2 makes it possible to convert a power outputted from the engine 150 into a rotational state of various rotational speeds and torque levels and output the rotational state to the vehicle axle 112.

As a whole, the control unit 190 controls operation of the power output unit of this embodiment. As is the case with the EFIECU 170, the control unit 190 is a one-chip microcomputer including a CPU, a ROM, a RAM and the like. The control unit 190 is connected to the EFIECU 170 so that various pieces of information can be exchanged therebetween. The control unit 190 supplies the EFIECU 170 with pieces of information which concern command values for torque and rotational speed and which are required to control the engine 150. Thereby the control unit 190 can indirectly control operation of the engine 150. Thus, the control unit 190 controls operation of the entire power output unit through exchange of information with the EFIECU 170. To realize such control, various sensors are connected to the control unit 190. For example, these sensors include a sensor for obtaining a rotational speed of the vehicle axle 112 and an accelerator pedal position sensor (not shown) for detecting a depression state of an accelerator pedal. In this embodiment, the ring gear shaft 126 is mechanically coupled to the vehicle axle 112. Therefore, the sensor 144 for obtaining a rotational speed of the vehicle axle 112 is provided on the ring gear shaft 126 to be commonly used as a sensor for controlling rotation of the motor MG2.

In addition to an operation mode wherein a power outputted from the engine 150 is transmitted to the vehicle axle 12 through the planetary gear 120 and the motors MG1, MG2 to realize a desired operation state in the vehicle axle 112, the hybrid vehicle of this embodiment can select other operation modes when travelling. For example, the hybrid vehicle can travel using a power supplied from the battery 194 with the engine 150 stopped.

Figure 6:
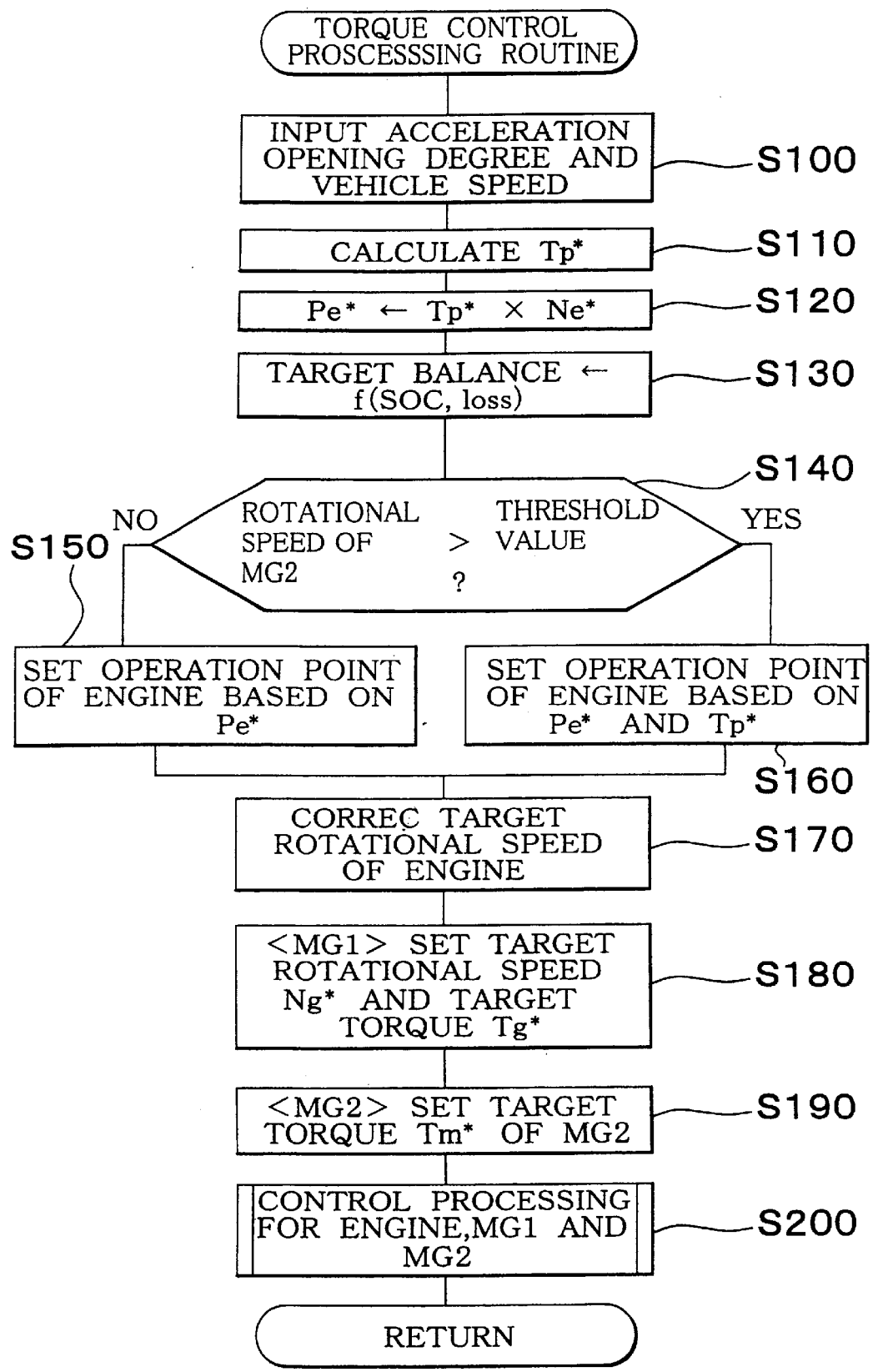
FIG. 6 is a flowchart showing a torque control processing routine.

Next, a torque control processing of this embodiment will be described. The torque control processing means a processing for controlling the engine 150 and the motors MG1, MG2 to output a power composed of a required torque and a rotational speed from the vehicle axle 112. FIG. 6 shows a flowchart of the torque control processing in this embodiment. This routine is repeatedly carried out by a CPU in the control unit 190 (hereinafter referred to as a CPU) through interruption of a timer at intervals of a predetermined period while the engine 150 is driven.

As soon as the torque control processing routine is started, the CPU receives an accelerator opening degree and a vehicle speed Nm (STEP S100). The accelerator opening degree can be obtained based on a signal inputted from the accelerator pedal position sensor. The vehicle speed Nm can be obtained from a rotational speed of the ring gear shaft 126 detected by the sensor 144. In the following processing, the rotational speed of the ring gear shaft 126 is used as a vehicle speed. Next, the CPU sets a drive force Tp* (a target torque acting on the ring gear shaft 126 although what is to be controlled is an output torque from the vehicle axle 112) based on the information inputted in STEP S100 (STEP S110). A relation of accelerator opening degrees and vehicle speeds with drive forces Tp* is preliminary stored in the form of a map in the ROM of the control unit 190. The CPU determines a drive force Tp* by referring to the map.

After calculation of the drive force Tp*, the CPU then calculates an engine power requirement Pe* (STEP S120). The engine power requirement Pe* is a travelling power calculated from a product of the drive force Tp* and the vehicle speed Nm. After calculation of the engine power requirement Pe*, the CPU calculates a target balance (STEP S130). The target balance is used as a criterion for correcting a power outputted from the engine to actually output a desired power from the vehicle axle 112. In the case where the power outputted from the engine 150 is transmitted to the vehicle axle 112 through the planetary gear 120 and the motors MG1, MG2 and outputted as a predetermined torque and a predetermined rotational speed, the power is not transmitted at the efficiency of 100%. Thus, in view of a loss in energy caused during transmission of the power, the engine 150 is required to output a power greater than the engine power requirement Pe* if a desired power is to be outputted at the vehicle axle 112. The power to be outputted from the engine 150 is also affected by a state of charge (SOC) of the battery 194. That is, if the state of charge of the battery 194 assumes a value smaller than a predetermined value, the engine 150 needs to provide energy for charging the battery 194 (actually carry out extra regeneration in the motors MG1, MG2). If the state of charge of the battery 194 assumes a value greater than the predetermined value, electric power needs to be taken out from the battery 194 to prevent overcharge of the battery 194. The power to be outputted by the engine 150 decreases as the electric power taken out from the battery 194 increases. In this manner, the target balance can be calculated as a function of a loss caused during transmission of power or a state of charge of the battery 194. That is, the target balance is calculated as a value indicating a difference in power to be outputted from the engine 150 in comparison with the engine power requirement Pe* calculated in STEP S120.

After calculation of the target balance, the CPU then determines whether or not the rotational speed of the motor MG2 has exceeded a threshold value for the rotational speed of the motor MG2 (STEP S140). The threshold value for the rotational speed at the time when the motor MG2 outputs power can be obtained from the output characteristic diagram of the motor MG2 shown in FIG. 4. That is, in FIG. 4, the rotational speed corresponding to an intersection point LIM between a line indicative of the limit of an operation state of the motor MG2 and the axis of abscissa is a threshold value at the time when the motor MG2 outputs power. It is determined whether or not the rotational speed Nm of the ring gear shaft 126 inputted in STEP S100 has exceeded the threshold value.

If it is determined that the rotational speed of the motor MG2 has not exceeded the threshold value, the CPU calculates a target operation point of the engine 150 according to normal control. That is, the CPU sets a target rotational speed Ne* and a target torque Te* for outputting the engine power requirement Pe* calculated in STEP S120 (STEP S150). In such control, a point of the highest operation efficiency is selected from the map as an operation point of the engine 150.

FIG. 7 shows a relation between operation points and operation efficiencies of the engine 150. A curve B shown in FIG. 7 indicates threshold values of torque and rotational speed which permit operation of the engine 150. In FIG. 7, curves marked with α1%, α2% and the like are iso efficiency curves where the efficiency of the engine 150 remains constant. The efficiency of the engine 150 decreases in the sequence of α1%, α2% and so on. As shown in FIG. 7, the engine 150 demonstrates a high efficiency within a certain range. The efficiency of the engine gradually decreases at operation points in the periphery of the range.

In FIG. 7, curves indicated by C1—C1, C2—C2 and C3—C3 are curves where power outputted from the engine 150 remains constant. The operation point of the engine 150 is selected on a predetermined one of these curves that corresponds to a power requirement. The power requirement decreases in the sequence of C1—C1, C2—C2 and C3—C3. For example, in the case where the power requirement Pe* for the engine 150 corresponds to a power indicated by the curve C1—C1, the operation point of the engine 150 is set to a point A1 of the highest operation efficiency. By the same token, the operation point is set to a point A2 on the curve C2—C2 and to a point A3 on the curve C3—C3. FIG. 8 shows a relation between rotational speeds and operation efficiencies of the engine 150. In FIG. 8, for convenience of explanation, only those curves which correspond to the three curves in FIG. 7 are exemplified as a curve corresponding to a predetermined power requirement. However, an infinite number of such curves can be drawn according to an output requirement, and it is possible to select an infinite number of points as the operation point A1 and the like of the engine 150. The curve A shown in FIG. 7 is a curve drawn by connecting points of high operation efficiency of the engine 150. This curve will be referred to as an operation curve.

Once the operation point of the engine 150 is set through the foregoing processings, the target rotational speed of the engine 150 set in STEP S150 is corrected (STEP S170). In the processing for correcting the engine speed, the target rotational speed of the engine 150 is corrected and a power outputted from the engine 150 is thereby corrected so that a desired power is actually outputted from the vehicle axle 112. In this case, the target rotational speed Ne* is corrected based on the target balance calculated in STEP S130 and a state of outputs from the motors MG1, MG2. If it is assumed that powers currently outputted from the motors MG1, MG2 are Pg, Pm respectively, the balance between a power outputted from the engine 150 and a power outputted from the vehicle axle 112 is indicated by the sum of Pg and Pm. A correction amount for the target rotational speed Ne* can be calculated by performing proportional-plus-integralplus-derivative control (PID control) based on a difference in balance expressed by the following formula.

Target balance−(Pg+Pm)

In STEP S170, a new target rotational speed Ne* of the engine 150 is obtained by adding the correction amount to the target rotational speed Ne* of the engine 150 calculated in STEP S150.

Although the values of Pg and Pm are supposed to represent powers currently outputted from the motors MG1, MG2, it is difficult to measure actual powers and output torque values. Thus, the values of Pg, Pm are calculated based on torque command values currently outputted for the motors MG1, MG2 (i.e. torque command values set at the time of the last implementation of the torque control processing routine) and actual measurement values of the sensor for detecting rotational speeds of the motors MG1, MG2. In the hybrid vehicle of this embodiment, control is normally performed such that the sum of Pg and Pm becomes equal to zero unless a loss in energy and a state of charge of the battery 194 as described above are taken into account. However, the control is actually performed in consideration of the target balance, and operation of the motors MG1, MG2 is retarded with respect to control commands. Thus, as described above, the sum of Pg and Pm is calculated based on actually measured rotational speeds. Based on a difference between the sum of Pg and Pm and the target balance, a correction amount for the target rotational speed Ne* is calculated. Because the PID control is a known control method, detailed description thereof will be omitted.

After correction of the target rotational speed Ne* of the engine 150 in STEP S170, an operation point of the motor MG1 is set. In other words, a target rotational speed Ng* and a target torque Tg* of the motor MG1 are set (STEP 180). A target rotational speed Ne* of the engine 150, namely, a target rotational speed Ne* of the planetary carrier shaft 127 has been set, and a target rotational speed of the vehicle axle 112, namely, a rotational speed Nm of the ring gear shaft 126 has been inputted. Therefore, it is possible to set a target rotational speed of the sun gear shaft 125, namely, a target rotational speed Ng* of the motor MG1 by means of the alignment chart shown in FIG. 2. Basically in STEP S180, a target rotational speed Ng* of the motor MG1 is set by a predetermined proportional calculation formula derived from the alignment chart. A formula (5) for calculating the target rotational speed Ng* of the motor MG1 is shown below. According to the character of the alignment chart shown in FIG. 2, the target torque Tg* of the motor MG1 can be calculated based on the formula (3). However, the target torque Tg* is actually set by means of PID control.

$$Ng^* = (1+\rho)/\rho \times Ne^* - 1/\rho \times Nm \qquad (5)$$

Once the operation point of the motor MG1 is set, the CPU then sets an operation point of the motor MG2 (STEP S190). The rotational speed Nm of the ring gear shaft 126 inputted in STEP S100 is given as a target rotational speed of the motor MG2. Thus, a target torque Tm* of the motor MG2 is set. Due to the character based on the alignment chart, the target torque Tm* of the motor MG2 can be calculated by putting a drive force Tp* and an engine target torque Te* into the formula (4). However, the target torque Tm* is actually set by means of PID control.

In accordance with the operation point that has thus been set, the CPU performs control processings relating to operations of the motors MG1, MG2 and the engine 150 (STEP S200) and terminates the present routine. During control of the motors MG1, MG2, voltages applied to the three-phase coils of the motors are set in accordance with the target rotational speed and the target torque that have been set. Then, in accordance with differences between the set voltages and currently applied voltages, the transistors of the drive circuits 191, 192 are switched. Because a method of controlling the synchronous motor is well known, detailed description thereof will be omitted.

Also, since a control processing for operating the engine 150 at the operation point that has been set is well known, description thereof will be omitted. However, it is the EFIECU 170 that actually performs control of the engine 150. Thus, in the processing of STEP S200 in the torque control processing routine, necessary pieces of information such as an operation point of the engine 150 are sent from the control unit 190 to the EFIECU 170. By sending information in this manner, the CPU of the control unit 190 indirectly controls operation of the engine 150.

If it is determined in STEP S140 that the rotational speed of the motor MG2 has exceeded the threshold value, the CPU sets a target operation point of the engine 150, namely, a target rotational speed Ne* and a target torque Te* (STEP S160) by means of control which is different from the normal control. Based on the drive force Tp* and the engine power requirement Pe* calculated in STEPS S110 and S120 respectively, the operation point of the engine 150 is set.

Figure 4:
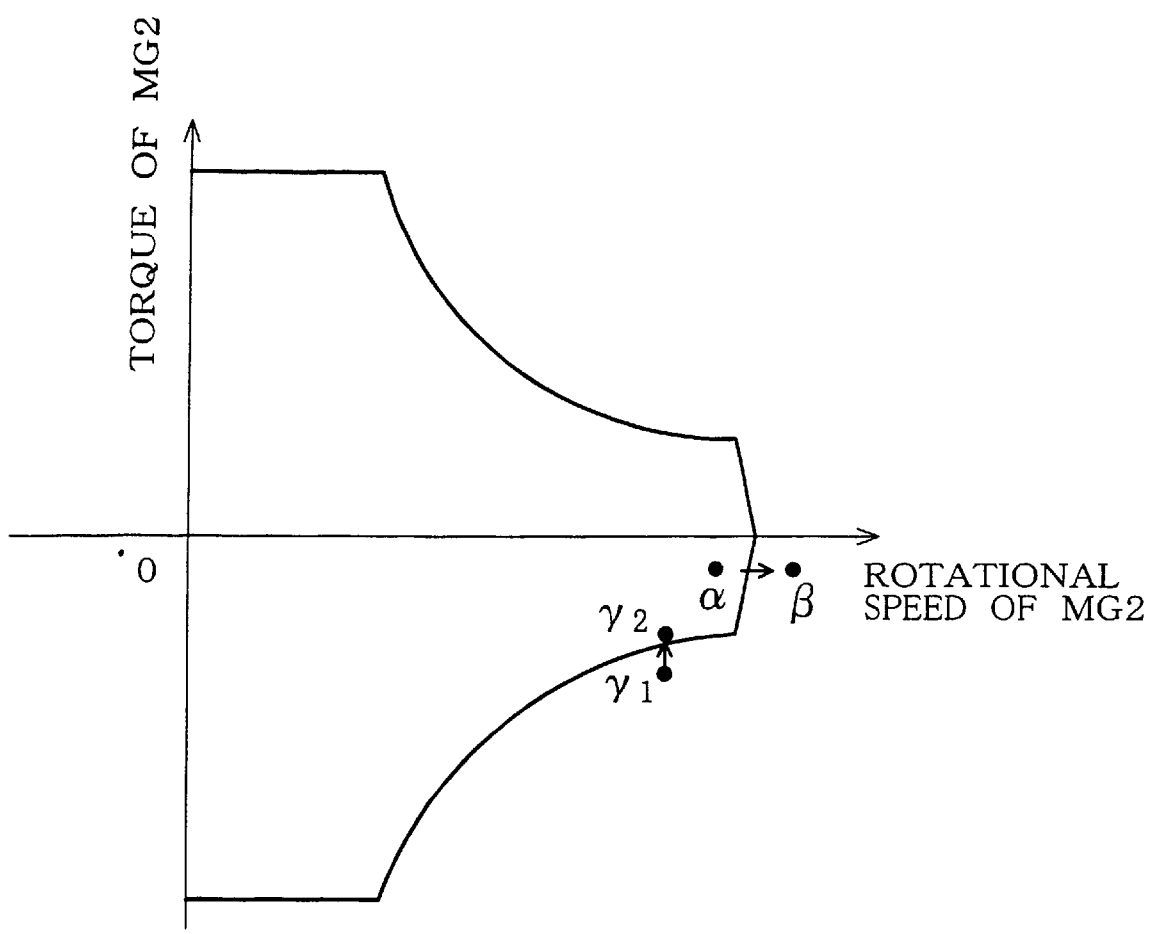
FIG. 4 is an explanatory view of an output characteristic of an MG2.

For example, a state where the rotational speed of the motor MG2 has exceeded the threshold value corresponds to an operation state indicated by a point β in FIG. 4. When the rotational speed of the motor MG2 (an operation state based on a torque command value currently outputted to the MG2 and the rotational speed Nm of the ring gear shaft 126 inputted in STEP S100) is greater than the threshold value at the time when the motor MG2 outputs power as in the case where the rotational speed of the motor MG2 corresponds to the point β shown in FIG. 4, the operation point of the engine 150 is not set to a point of the highest efficiency but to a point where the target torque Tm* of the MG2 is zero. By substituting zero for Tm in the formula (4), the following formula (6) is established.

$$Te = (1+\rho) \times Tp \qquad (6)$$

Tp, namely, the drive force Tp* is calculated in STEP S110. The target torque Te* of the engine 150 is calculated by substituting the value Tp* calculated in STEP S110 for Tp in the formula (6).

After the target torque Te* has thus been calculated, a target rotational speed Ne* of the engine 150 is calculated based on the target torque Te*. FIG. 7 shows a relation between operation points and operation efficiencies of the engine 150. However, as described above, when a power requirement is determined, the engine 150 can adopt various operation points on a curve corresponding to the power requirement (on a predetermined curve where the outputted power remains constant as indicated by C1—C1, C2—C2 and C3—C3). Thus, in this case, an operation point corresponding to the target torque Te* calculated based on the formula (6) is selected on one of those curves that corresponds to the power requirement Pe* calculated in STEP S120, and the target rotational speed Ne* of the engine 150 is set.

Figure 9:
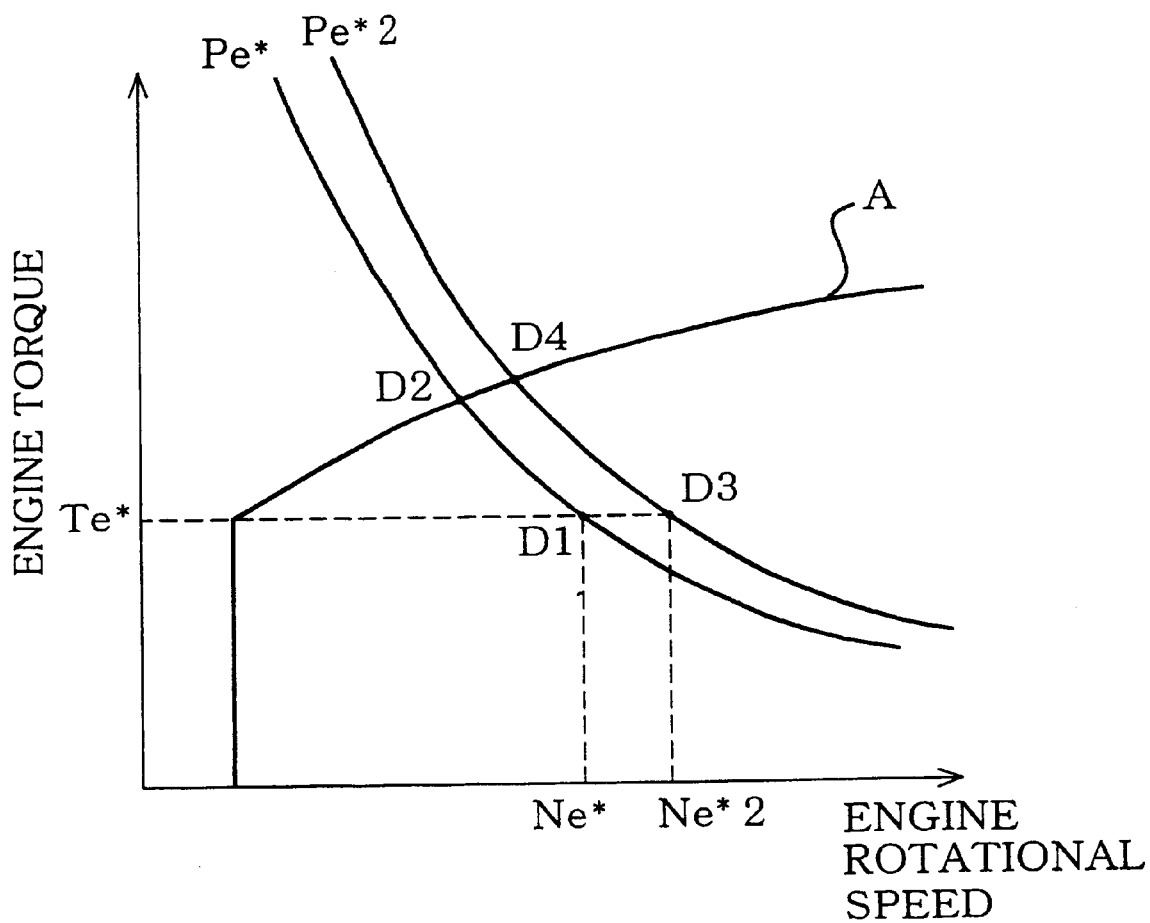
FIG. 9 is an explanatory view showing how to set an operation point of an engine 150.

FIG. 9 shows a curve Pe* drawn by connecting operation points where the power requirement Pe* calculated in STEP S120 is equal to Pe*. In STEP S160, an operation point D1 where the engine torque is equal to the value Te* calculated based on the formula (6) is selected on the curve Pe*, and a target rotational speed Ne corresponding to the operation point is calculated. FIG. 9 also shows an operation curve A drawn by connecting points of the highest operation efficiencies of the engine (the same curve as the curve A shown in FIG. 7). However, in STEP S150, an operation point corresponding to an intersection point D2 between the curve Pe* and the operation curve A is set as an operation point of the engine 150.

Once the operation point of the engine is set, processings similar to those in STEPS S170 to STEP S200 are performed. In STEP S170, the target rotational speed Ne* of the engine 150 is corrected based on the target balance calculated in STEP S130, whereby the engine power requirement Pe* is corrected. According to such a processing shown in FIG. 9, the target rotational speed Ne* is corrected to Ne*2 without changing the target torque Te*, whereby an operation point D3 is set as the operation point of the engine 150. The operation point D3 is a point on a curve where the power outputted from the engine 150 is equal to Pe*2. Therefore, the power outputted from the engine 150 is corrected to Pe through such a processing.

In STEP S180, an operation state of the motor MG1 is set. The target rotational speed Ne* of the planetary carrier shaft 127 is set as the corrected target rotational speed Ne*2 of the engine 150, and the rotational speed Nm of the ring gear shaft 126 has also been inputted. Thus, a rotational speed of the sun gear shaft 125, namely, a target rotational speed Ng* of the motor MG1 is set based on the alignment chart (actually based on the formula (5)). Also, according to the character of the alignment chart, the target torque Tg* of the motor MG1 can be expressed by a formula (7), which is obtained from the formulas (3) and (6). The target torque Tg* of the motor MG1 is actually set by means of PID control.

$$Tg^* = -\rho \times Tp^* \quad (7)$$

In STEP S190, an operation state of the motor MG2 is set. A target rotational speed of the motor MG2 is a vehicle speed Nm inputted in STEP S100, and the processings in STEP S160 and the following STEPS are performed such that the target torque Tm* of the motor MG2 becomes equal to zero. For this reason, an operation state of the motor MG2 is actually not determined again. In STEP S170, the power requirement Pe* for the engine 150 is corrected by correcting the target rotational speed Ne* of the engine 150 without changing the target torque Te* of the engine 150. Therefore, the target torque of the motor MG2 remains equal to zero (see the formula (3)). In accordance with the operation point that has thus been set, the CPU performs control processings concerning operations of the motors MG1, MG2 and the engine 150 (STEP S200), and then terminates the present routine.

Figure 10:
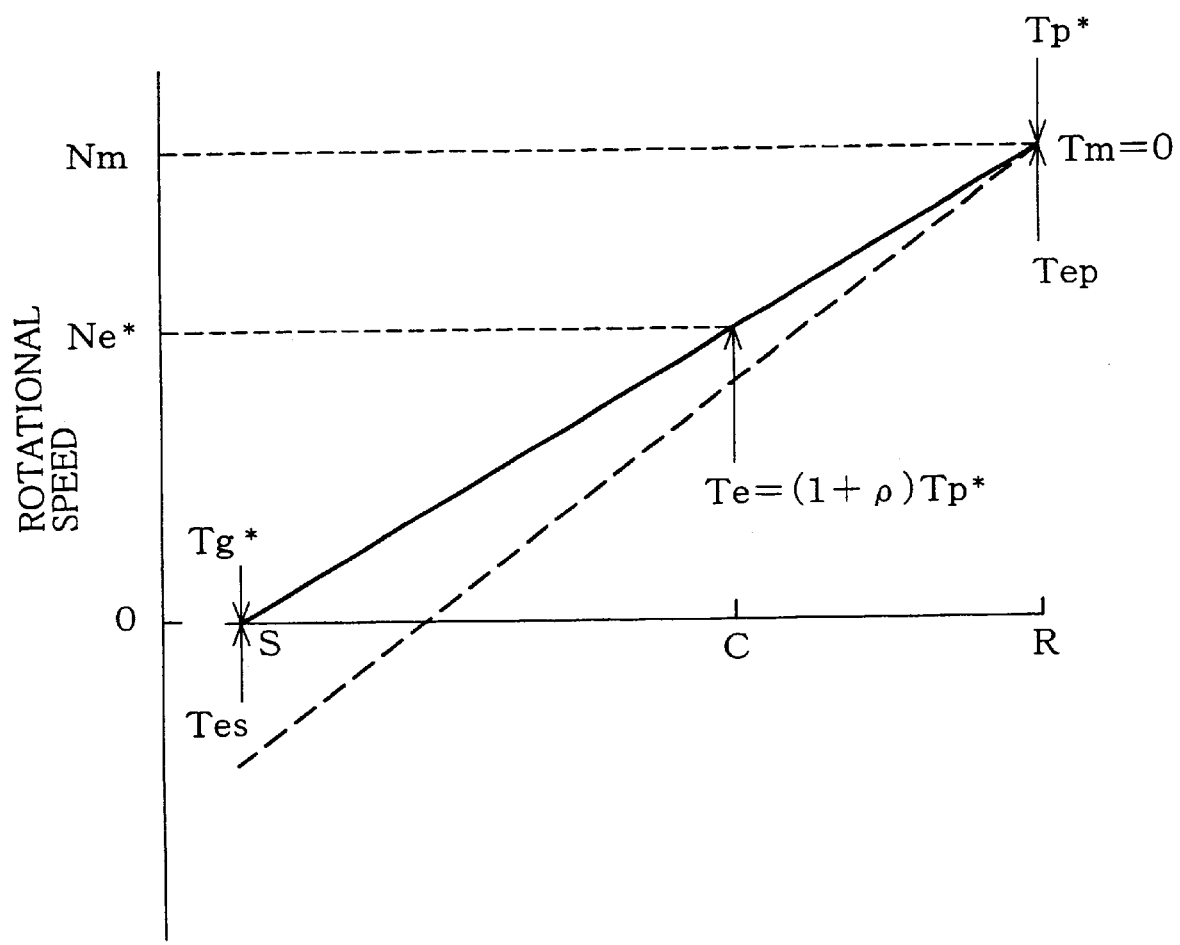
FIG. 10 is an alignment chart explaining an operation principle of the power output unit of the embodiment.

FIG. 10 shows, with a solid line, an alignment chart for the case where the aforementioned processings in STEPS160 and the following STEPS are performed. In the case where the processings in STEP S160 and the following STEPS are performed, a power requirement Pe* for the engine is calculated based on the drive force Tp* calculated in STEP S110, and an operation point of the engine is set based on the power requirement Pe*. At this moment, a target rotational speed Ne* and a target torque Te* of the engine 150 are calculated such that the target torque of the motor MG2 becomes equal to zero. In accordance with these calculation results, an operation state of the motor MG1 is set.

Figure 5:
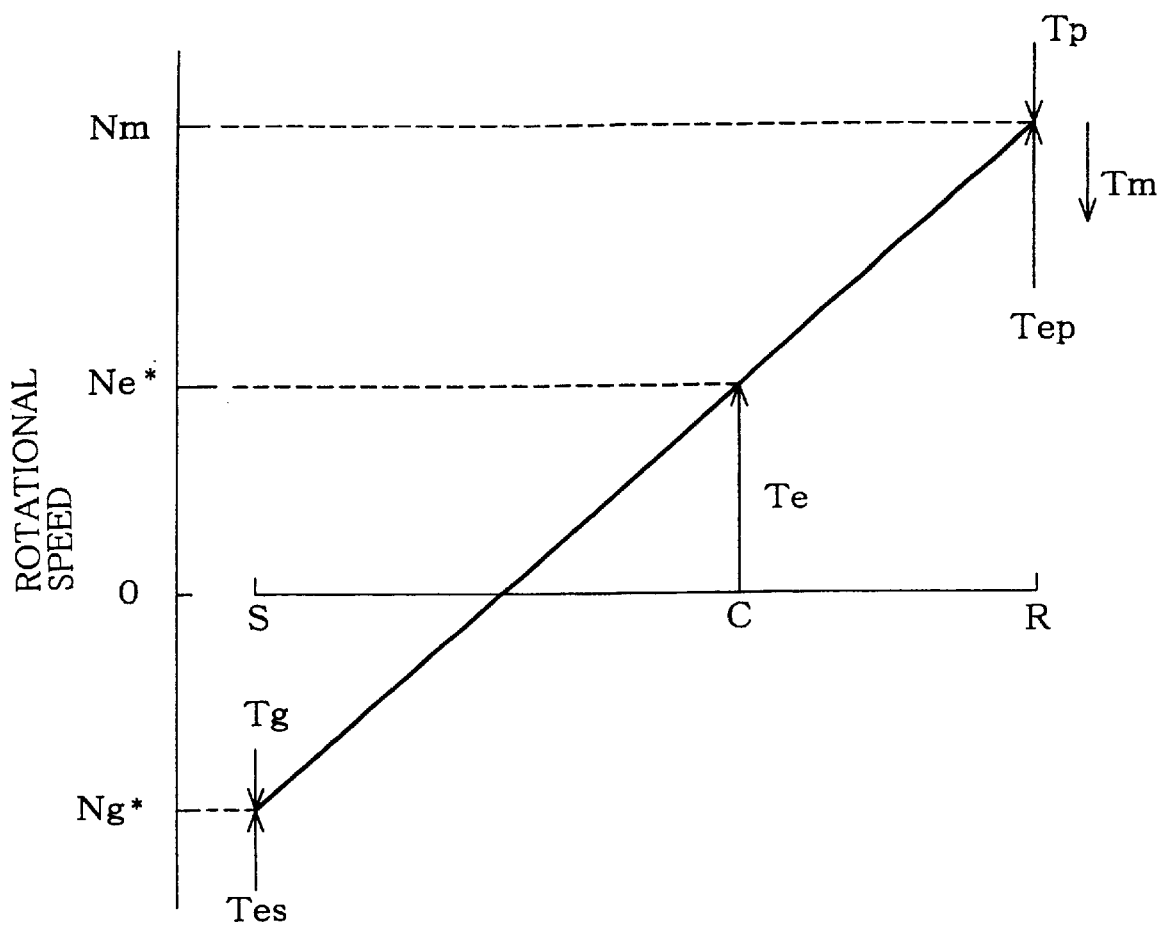
FIG. 5 is an alignment chart explaining an operation principle of the power output unit of the embodiment.

In the case where the processings in STEP S150 and the following STEPS are performed when the vehicle travels at a similarly high speed, the state in the alignment chart shown in FIG. 5 arises. In the case where the processings in STEP S150 and the following STEPS are performed, a power requirement Pe* for the engine is calculated based on the drive force Tp*, and an operation point of the engine 150 is set based on the power requirement Pe*. At this moment, a target rotational speed Ne* and a target torque Te* (Te in FIG. 5) of the engine 150 are calculated such that the engine 150 demonstrates its highest efficiency. In accordance with these calculation results and the rotational speed Nm of the ring gear shaft 126, a target torque Tg* of the motor MG1, a target torque Tm* of the motor MG2 and a target rotational speed Ng* of the motor MG1 are calculated.

In addition to the alignment chart for the case where the processings in STEP S160 and the following STEPS are performed, FIG. 10 shows, with a dotted line, an alignment chart corresponding to a state which is set in the case where the processings in STEP S150 and the following STEPS are performed with the rotational speed Nm and the drive force Tp* of the ring gear shaft 126 remaining the same. In the operation state shown in the alignment chart of FIG. 10 corresponding to the case where the processings in STEP S160 and the following STEPS are performed, the target rotational speed Ne* of the engine 150 is increased and the target torque Te* of the engine 150 is reduced accordingly on an iso-output-power curve, in comparison with the case where the processings in STEP S150 and the following STEPS are performed (see FIG. 9). Thus, Tep and the drive force Tp*, which are divisions of Te*, are balanced against each other so that the target torque Tm* of the motor MG2 becomes equal to zero. If operation is performed in this manner, an output shaft of the motor MG2 rotates at a rotational speed Nm without outputting torque, and the ring gear shaft 126 rotates at the rotational speed Nm and outputs an engine direct-transmission torque Tep (a torque generated at the ring gear shaft 126 by a torque outputted from the engine 150) which is balanced against the drive force Tp*.

If the output torque of the motor MG2 is approximately equal to zero, the power Pm outputted from the motor MG2 is also approximately equal to zero. Thus, in a state where the power Pg outputted from the motor MG1 is balanced against the power Pm outputted from the motor MG2 without taking the target balance into account and where the sum of the power Pg and the power Pm is equal to zero, if the output torque of the motor MG2 is approximately equal to zero, the power Pg outputted from the motor MG1 is also approximately equal to zero. In FIG. 10 showing such a state, the target torque Tg* of the motor MG1 is expressed as a force that is balanced against a torque Tes which is obtained by distributing the torque Te* of the engine 150 based on a law of distribution applicable to a rigid body, and the target rotational speed Ng* of the motor MG1 is expressed as a value approximately equal to zero. In the case where the processings shown in FIG. 6 are performed and where control in which the target balance is taken into account is actually performed, the motor MG1 carries out regeneration or power running in accordance with a state of charge of the battery 194. Thus, the sun gear shaft 125 rotates at a predetermined rotational speed.

In the power output unit of this embodiment, if the operation state of the motor MG2 set in STEP S190 exceeds a threshold value, the output torque of the motor MG2 is forcibly made approximately equal to zero in STEP S200, whereby an operation state exceeding the threshold value does not arise. Then, when the torque control processing routine is performed next, the operation state of the motor MG2 set in STEP S190 during the last performance of the routine (an operation state exceeding the threshold value of the operation state of the motor MG2) is called in STEP S140. It is then judged that the operation state of the motor MG2 has exceeded the threshold value, and the processings in STEP S160 and the following STEPS are performed. Thus, even in the case where the operation state of the motor MG2 exceeds the threshold value as a result of the processings in STEP S150 and the following STEPS, the motor MG2 does not operate in a state exceeding the threshold value. That is, while the balance in output between the motor MG1 and the motor MG2 is maintained, a desired travelling state is realized immediately.

In the aforementioned embodiment, a target balance is calculated in STEP S130, and the target rotational speed of the engine 150 is corrected in STEP S170 as a result of the calculation, whereby the power requirement Pe* for the engine 150 is corrected. However, first of all, the power requirement Pe* for the engine 150 may be corrected based on the target balance calculated in STEP S130. An operation point of the engine 150 may be set in STEPS S150 and S160 based on the corrected power requirement Pe*.

In such a case, first of all, the power requirement Pe* to be outputted from the engine 150 is corrected based on the target balance calculated in STEP S130. This corresponds to an operation of setting an operation point of the engine 150 on a curve Pe*2 instead of the curve Pe* in FIG. 9. In the case where it is determined in STEP S140 that the operation state of the motor MG2 has exceeded the threshold value and where the processings in STEP S160 and the following STEPS are performed, an operation point where the target torque Te* of the engine 150 assumes a value corresponding to the formula (6) (an operation point where the target torque Tm* of the motor MG2 is equal to zero) is selected on the curve Pe*2. That is, the operation point D3 shown in FIG. 9 is selected to set an operation state of the engine 150. In the case where it is determined in STEP S140 that the operation state of the motor MG2 does not exceed the threshold value and where the processings in STEP S150 and the following STEPS are performed, an operation point D4, that is, an intersection point of the curve Pe* and the operation curve A can be selected to set an operation state of the engine 150.

In a vehicle equipped with the thus-constructed power output unit of this embodiment, if the rotational speed of the motor MG2 has exceeded a threshold value, an operation state of the motor MG2 is set such that the output torque Tm* becomes approximately equal to zero. Based on the operation state of the motor MG2 that has thus been set and a power requirement, operation states of the engine 150 and the motor MG1 are set. Thus, while the ring gear shaft 126 is caused to rotate at a rotational speed exceeding a threshold value of the rotational speed that can be outputted by the motor MG2 by outputting a sufficient power from the engine 150, a desired torque can be outputted from the ring gear shaft 126 through an engine direct-transmission torque. Therefore, the vehicle speed is not limited by the performance of the motor MG2. Thus, since the vehicle speed is not limited by the performance of the motor MG2, the motor MG2, which is to be installed in a vehicle to ensure a predetermined vehicle speed, can be reduced in size. Because the motor MG2 can further be reduced in size, it is possible to achieve a variety of effects such as a reduction in weight of the vehicle, an improvement of a degree of freedom in designing the vehicle, and a reduction in manufacturing cost of the vehicle.

The foregoing description refers to the control which is performed if it is determined in STEP S140 that the rotational speed of the motor MG2 has exceeded the threshold value (an operation state corresponding to the point β shown in FIG. 4). However, similar processings can also be performed in the presence of an operation state corresponding to a point γ1 shown in FIG. 4. That is, similar processings can also be performed in the case where the rotational speed of the motor MG2 has not exceeded the threshold value and where the target torque set for the motor MG2 exceeds the threshold value of the motor MG2 shown in FIG. 4. As in the operation state corresponding to the point γ1, in the case where the rotational speed of the motor MG2 has not exceeded a threshold value of the rotational speed that can be outputted by the motor MG2 (a rotational speed corresponding to a point LIM), the rotational speed Nm of the motor MG2 is set to a value calculated from a vehicle speed. As the target torque Tm*, a smaller value in the range of the threshold value of an operation state of the motor MG2 is selected to determine an operation point. In accordance with FIG. 4, an operation point corresponding to a point γ2 instead of the point γ1 is selected. Based on the operation point of the motor MG2 that has thus been set and the power requirement Pe* for the engine 150, an operation point of the engine 150 can be set. This further makes it possible to set an operation point of the motor MG1.

Thus, in the case where the aforementioned processings are performed in an operation state corresponding to the point γ1 shown in FIG. 4, if it is determined in STEP S140 of the torque control processing routine shown in FIG. 6 that the rotational speed of the motor MG2 has not exceeded the threshold value, the processings from STEP S150 to STEP S190 are performed temporarily to set a target torque Tm* of the motor MG2 during normal control. It is determined whether or not an operation state expressed by the temporarily set target torque Tm* of the motor MG2 and the rotational speed Nm has exceeded a threshold value of the operation state of the motor MG2 shown in FIG. 4 (e.g. an operation state corresponding to the point γ1). That is, it is determined whether or not the target torque has exceeded the threshold value. If it is determined that the target torque has exceeded the threshold value, the aforementioned processings can be performed instead of the processings in STEP S160 and the following STEPS. In such processings, an operation state of the motor MG2 (e.g. an operation state corresponding to the point γ2) is again set such that a value smaller than a range of the threshold value of the operation state of the motor MG2 is selected. Based on the output torque of the motor MG2 becoming equal to Tm* and on the power requirement Pe*, the operation state of the engine 150 is again set. Basically, if the power outputted from the engine 150 is corrected by correcting the target rotational speed of the engine 150, a desired torque can be outputted from the motor MG2.

Although the foregoing description relates to the control for the case where the operation state of the motor MG2 exceeds the threshold value, similar control can be performed as to the motor MG1. As described above, the output torque Tg* of the motor MG1 is determined by the engine output torque Te*. It is possible that the output torque Tg* might exceed the threshold value of the motor MG1. When the output torque of the motor MG1 exceeds the threshold value, even if the power outputted from the engine 150 is sufficient, it is impossible to obtain a sufficient drive force Tp simply by setting the output torque of the motor MG1 to a small value. In such a case, the output torque Tg* of the motor MG1 is determined such that the operation state of the motor MG1 does not exceed the threshold value. The engine output torque Te* is set based on the output torque Tg*. Also, the output torque Tm* of the motor MG2 is set such that the drive force Tp* acts on the ring gear shaft 126 (see the formulas (3) and (4)). The engine speed Ne* can be set based on the engine power requirement Pe* and the engine output torque Te*, and the rotational speed of the motor MG1 is finally set. By performing such control, a sufficient power is outputted from the engine 150 regardless of a threshold value of the performance of the motor MG1. Thereby it becomes possible to output a power composed of a desired torque and a desired rotational speed from the ring gear shaft 126.

In this embodiment, the hybrid vehicle employing the planetary gear 120 is exemplified. The present invention is applicable not only to such a construction but also to hybrid vehicles having other constructions. Basically, the planetary gear 120, the engine 150, the motor MG1 and the motor MG2 can be coupled to one another in various manners. It is also possible to employ another mechanism which operates in substantially the same manner as the planetary gear 120, namely, another mechanism which has three rotational shafts and which arbitrarily distributes a power inputted from one of the rotational shafts to the other two rotational shafts to output the distributed power.

Figure 11:
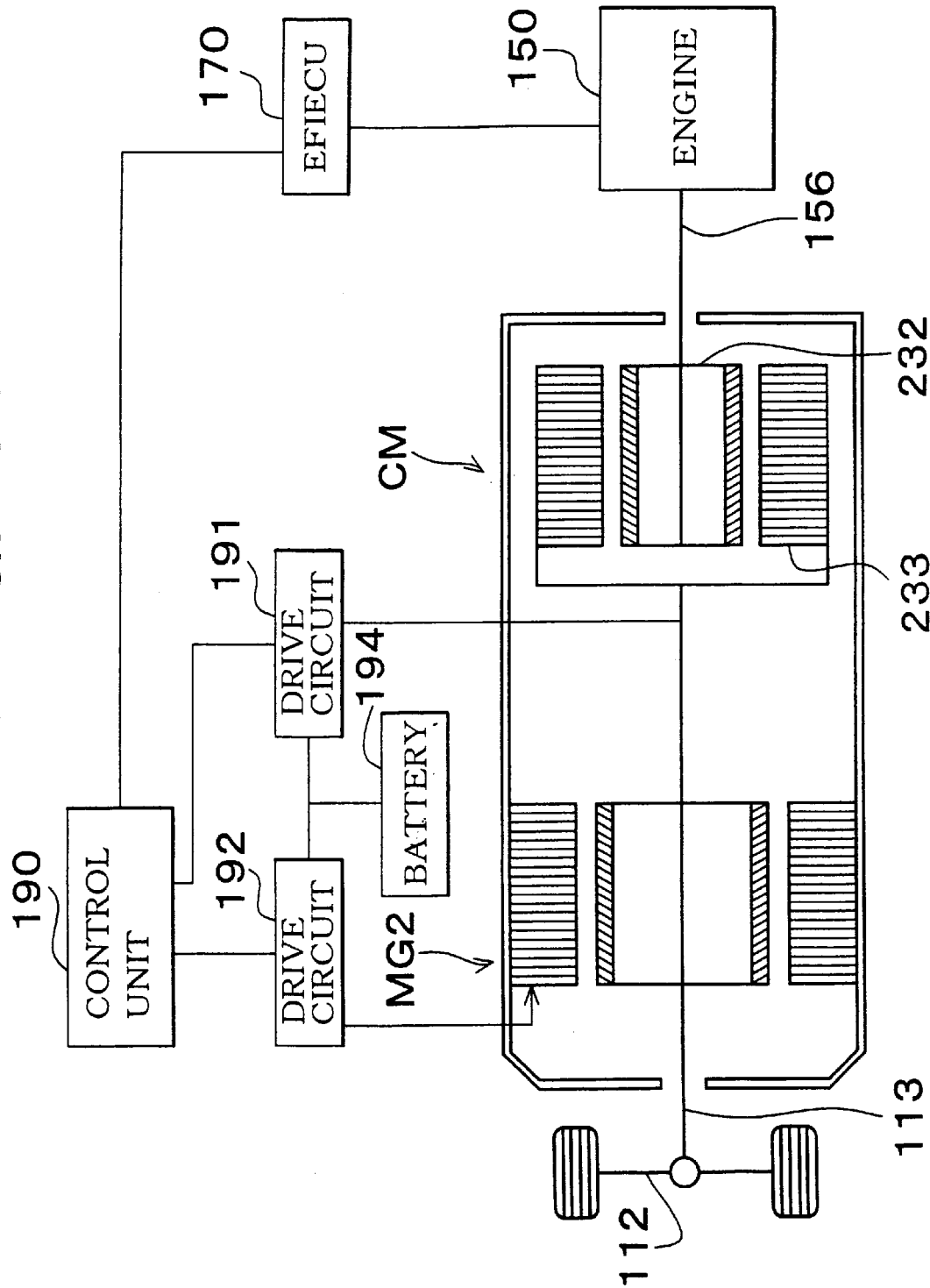
FIG. 11 is an explanatory view schematically showing the structure of a hybrid vehicle in accordance with a second embodiment of the present invention.

Next, a second embodiment of the present invention will be described. FIG. 11 is an explanatory view showing the structure of a hybrid vehicle in accordance with the second embodiment. The hybrid vehicle of the second embodiment is different from that of the first embodiment in that a clutch motor CM is used instead of the planetary gear 120 and the motor MG1. In FIG. 11, those components which correspond to the hybrid vehicle shown in FIG. 1 are denoted by the same reference numerals, and the description of the same construction as in the first embodiment will be omitted.

The clutch motor CM is a paired-rotor electric motor having a pair of rotors which rotate relative to each other around a single axis, that is, an inner rotor 232 and an outer rotor 233. In this embodiment, a permanent magnet is stuck to the inner rotor 232 as is the case with the motor MG2, and a motor around which a coil is wound is employed as the outer rotor 233. The crank shaft 156 of the engine 150 is coupled to the inner rotor 232, and the rotor of the motor MG2 is coupled to the outer rotor 233. Also, the outer rotor 233 is mechanically coupled to the drive shaft 113.

In the clutch motor CM, magnetic coupling between the inner rotor 232 and the outer rotor 233 can be controlled by controlling supply of electric current to the coil in the drive circuit 191. As in the first embodiment, the drive circuit 191 is composed of a transistor inverter. Through such magnetic coupling, a power that has been outputted from the engine 150 can be transmitted to the drive shaft 113. The inner rotor 232 and the outer rotor 233 are caused to rotate relative to each other with a predetermined amount of slippage, whereby an electric power corresponding to the amount of slippage can be regenerated. As a matter of course, it is possible to output a torque through the supply of electric power from the battery 194. Though composed of a single body, the clutch motor CM can achieve substantially the same effect as a combination of the planetary gear 120 and the motor MG1.

Also in such a hybrid vehicle, substantially the same control as in the first embodiment can be performed. An operation of performing substantially the same processing as the torque control processing routine shown in FIG. 6 in the hybrid vehicle of the second embodiment will be described below. For convenience of explanation, the correction processing based on the target balance shown in FIG. 6 is omitted.

First of all, an accelerator opening degree and a vehicle speed (a rotational speed of the drive shaft 13) Nm are inputted, and a drive force Tp* is calculated based on the accelerator opening degree and the vehicle speed (see STEP S100 and STEP S110 in FIG. 6). After calculation of the drive force Tp*, the CPU then calculates an engine power requirement Pe* as a travelling power that is calculated from a product of the drive force Tp* and the vehicle speed Nm (see STEP S120). Thereafter, as in STEP S140, it is determined whether or not an operation state of the motor MG2 (an operation state based on a torque command value currently outputted to the motor MG2 and a rotational speed Nm of the drive shaft 113 that has already been inputted) has exceeded the threshold value.

In the case where the rotational speed of the motor MG2 exceeds the threshold value as in the operation state corresponding to the point β shown in FIG. 4, the operation state of the motor MG2 is set substantially in the same manner as in the first embodiment. That is, the target torque Tm* is made approximately equal to zero, and the target rotational speed is set to the value Nm. In the case where the operation state of the motor MG2 corresponds to the point γ1, the operation state of the motor MG2 is set such that the target rotational speed becomes equal to the value Nm and that the target torque Tm* does not exceed a threshold value of the performance of the motor MG2 (see the point γ2 in FIG. 4).

In a hybrid vehicle constructed as shown in FIG. 11, once the target torque Tm* of the motor MG2 and the drive force Tp* are determined, a target torque Tc* of the clutch motor CM can be determined from a difference therebetween. If the target torque Tm* of the motor MG2 is approximately equal to zero, the drive force Tp* is equal to the target torque Tc* of the clutch motor CM.

In the hybrid vehicle of the second embodiment, the output torque of the clutch motor CM is equal to the output torque of the engine 150. Thus, if the target torque Tc* of the clutch motor CM is set, the target torque Te* of the engine 150 is also determined. Further, since the power requirement Pe* for the engine 150 has been calculated (STEP S120), the target rotational speed Ne* of the engine 150 is also determined based on the power requirement Pe* and the target torque Te*.

If it is determined that the operation state of the motor MG2 has not exceeded the threshold value, the power requirement Pe* for the engine is outputted. Therefore, an operation point of the highest efficiency is set for the engine 150. After such determination of the target torque Te* and the target rotational speed Ne* of the engine 150, the target torque Tc* of the clutch motor CM is set to a value equal to the target torque Te*. Based on a difference between the drive force Tp* and the target torque Tc* of the clutch motor CM, the target torque Tm* of the motor MG2 is set. Actually, when performing such control, a correction is made by means of a target balance as shown in FIG. 6. Operation states of the engine 150 and the clutch motor CM are corrected based on the target balance.

The foregoing description relates to the case where the operation state of the motor MG2 exceeds the threshold value in the hybrid vehicle constructed as shown in FIG. 11. If the output torque of the clutch motor CM exceeds a threshold value, the operation state of the engine 150 is set according to the performance of the clutch motor CM, whereby it becomes possible to output a desired torque from the drive shaft 113. If the output torque of the clutch motor CM exceeds a threshold value, the target torque Tc* is set to prevent the output torque of the clutch motor CM from exceeding the threshold value. Because the target torque Tc* of the clutch motor CM is equal to the target torque Te* of the engine 150, it is possible to set a target rotational speed Ne* of the engine 150 from the target torque Te* of the engine 150 and the engine power requirement Pe*. Also, the target torque Tm* of the motor MG2 can be set as a difference between the drive force Tp* and the target torque Tc* of the clutch motor CM.

In this manner, also in the hybrid vehicle of the second embodiment, a sufficient power is outputted from the engine 150, and an operation state of the engine 150 is set in accordance with threshold values of operation states of the motor MG2 and the clutch motor CM. Thereby it becomes possible to output a desired rotational speed and a desired torque in the drive shaft 113 and sufficiently ensure the performance of the vehicle without enlarging the motor MG2 or the clutch motor CM.

While the present invention has been described with reference to what are presently considered to be preferred embodiments thereof, it is to be understood that the present invention is not limited to the disclosed embodiments or constructions. On the contrary, the present invention is intended to cover various modifications and equivalent arrangements. In addition, while the various elements of the disclosed invention are shown in various combinations and configurations which are exemplary, other combinations and configurations, including more, less or only a single embodiment, are also within the spirit and scope of the present invention.

What is claimed is:

1. A power output unit comprising:

an engine having an output shaft;

electric motors coupled to a drive shaft transmitting a power outputted from the engine through the output shaft to the outside;

a power adjuster which is coupled to the output shaft and the drive shaft and which adjusts a power from the output shaft by means of electric power to transmit the power to the drive shaft;

a power requirement calculator which calculates a power required for the engine;

a rotational speed judging device which detects a rotational speed of the drive shaft and which compares the rotational speed with a permissible rotational speed of the electric motors;

an operation state setting device, wherein the operating state setting device sets operation states of the electric motors such that when an operating limit of the electric motors is reached, the electric motors assume an output torque approximately equal to zero and a rotational speed equal to a rotational speed of the drive shaft, and further wherein the operating state setting device sets an operation state of the engine based on the set operation states of the electric motors and the power requirement; and an operator which operates the engine, the power adjuster and the electric motors based on the operation state set by the operation state setting device.

2. A hybrid vehicle which has the power output unit according to claim 1 and which travels by means of a power outputted from the drive shaft.

3. The power output unit according to claim 1, wherein:

the power adjuster has a generator and a planetary gear having three rotational shafts;

the three rotational shafts are respectively coupled to the generator, the output shaft of the engine and the drive shaft.

4. A hybrid vehicle which has the power output unit according to claim 3 and which travels by means of a power outputted from the drive shaft.

5. The power output unit according to claim 1, wherein:

the power adjuster has a paired-rotor electric motor having two rotors which can rotate relative to each other.

6. A hybrid vehicle which has the power output unit according to claim 5 and which travels by means of a power outputted from the drive shaft.

7. The power output unit according to claim 1, further comprising:

a secondary battery which can exchange electric power with the power adjuster and with the electric motors; and a balance calculator which calculates an energy balance at least based on an energy loss generated during transmission of the power from the engine to the drive shaft and on a requirement for charge and discharge in the secondary battery, wherein:

the operation state setting device corrects the power outputted from the engine by correcting a rotational speed of the engine based on the energy balance calculated by the balance calculator, when setting an operation state of the engine; and the operator operates the engine and the power adjuster based on the power corrected by the operation state setting device.

8. A hybrid vehicle which has the power output unit according to claim 7 and which travels by means of a power outputted from the drive shaft.

9. A power output unit comprising:

an engine having an output shaft;

electric motors coupled to a drive shaft transmitting a power outputted from the engine through the output shaft to the outside;

a power adjuster which is coupled to the output shaft and the drive shaft and which adjusts a power from the output shaft by means of electric power to transmit the power to the drive shaft;

a power requirement calculator which calculates a power required for the engine;

a rotational speed judging device which detects a rotational speed of the drive shaft and which compares the rotational speed with a permissible rotational speed of the electric motors;

a torque setting device which sets an operation state of the engine based on the calculated power requirement and which sets output torque values of the electric motors based on the set operation state of the engine when the detected rotational speed is equal to or lower than the permissible rotational speed;

a torque judging device which compares the set output torque values of the electric motors with a predetermined amount;

an operation state setting device, wherein the operating state setting device sets operation states of the electric motors such that when an operating limit of the electric motors is reached, the electric motors assume an output torque approximately equal to zero and a rotational speed equal to a rotational speed of the drive shaft, and further wherein the operating state setting device sets an operation state of the engine based on the set operation states of the electric motors and the power requirement; and an operator which operates the engine, the power adjuster and the electric motors based on the operation state set by the operation state setting device.

10. A hybrid vehicle which has the power output unit according to claim 9 and which travels by means of a power outputted from the drive shaft.

11. A method of controlling a power unit including:

an engine having an output shaft;

electric motors coupled to a drive shaft transmitting a power outputted from the engine through the output shaft to the outside;

a power adjuster which is coupled to the output shaft and the drive shaft and which adjusts a power from the output shaft by means of electric power to transmit the power to the drive shaft, comprising the steps of:

calculating a power required for the engine;

detecting a rotational speed of the drive shaft and comparing the rotational speed with a threshold value of a rotational speed that is permissible when the electric motors output power; and setting operation states of the electric motors such that the electric motors assume an output torque approximately equal to zero and a rotational speed equal to a rotational speed of the drive shaft when the detected rotational speed is higher than an operating limit of the electric motors.

* * * * *